United States Patent
Heinrich et al.

(10) Patent No.: US 7,606,264 B2
(45) Date of Patent: Oct. 20, 2009

(54) METHOD AND ARRANGEMENT FOR PROVIDING SERVICES BETWEEN DATA PROCESSING DEVICES

(75) Inventors: Clemens Heinrich, Berlin (DE); Henrik Koschitzki, Berlin (DE); Steffen Wittich, Berlin (DE)

(73) Assignee: Francotyp-Postalia GmbH (DE)

( * ) Notice: Subject to any disclaimer, the term of this patent is extended or adjusted under 35 U.S.C. 154(b) by 774 days.

(21) Appl. No.: 11/271,566

(22) Filed: Nov. 12, 2005

(65) Prior Publication Data

US 2006/0126602 A1 Jun. 15, 2006

(30) Foreign Application Priority Data

Nov. 11, 2004 (DE) ........................ 10 2004 054 648

(51) Int. Cl.
H04L 12/28 (2006.01)
(52) U.S. Cl. .................. 370/474; 370/477; 709/217
(58) Field of Classification Search ................. 370/400, 370/474, 477, 522
See application file for complete search history.

(56) References Cited

U.S. PATENT DOCUMENTS

| | | | |
|---|---|---|---|
| 4,528,644 A | 7/1985 | Soderberg et al. | |
| 5,369,401 A | 11/1994 | Haines | |
| 7,464,342 B2 * | 12/2008 | Savage et al. | 715/840 |
| 2003/0004762 A1 * | 1/2003 | Banerjee et al. | 705/5 |
| 2003/0033369 A1 | 2/2003 | Bernhard | |
| 2003/0110242 A1 | 6/2003 | Brown et al. | |
| 2003/0126312 A1 * | 7/2003 | Frolund et al. | 709/328 |
| 2003/0140119 A1 * | 7/2003 | Acharya et al. | 709/219 |
| 2003/0236824 A1 * | 12/2003 | Alsafadi et al. | 709/203 |
| 2005/0154610 A1 * | 7/2005 | Heinrich et al. | 705/1 |
| 2006/0178996 A1 * | 8/2006 | Matsushima et al. | 705/50 |
| 2006/0224526 A1 * | 10/2006 | Klug | 705/410 |

FOREIGN PATENT DOCUMENTS

| | | |
|---|---|---|
| EP | 1 542 123 | 6/2005 |
| WO | WO 02/13145 | 2/2002 |
| WO | WO 02/095605 | 11/2002 |
| WO | WO 2004/053639 | 6/2004 |
| WO | WO 2004/092982 | 10/2004 |

\* cited by examiner

*Primary Examiner*—Min Jung
(74) *Attorney, Agent, or Firm*—Schiff Hardin LLP

(57) ABSTRACT

In a method and arrangement for providing services, a first data processing device provides a service for a remote second data processing device, the first service being implemented according to a service configuration and the first service configuration is modularly composed of a plurality of components, with at least one of the components of the service configuration being modifiable to update the service.

52 Claims, 5 Drawing Sheets

METHOD AND ARRANGEMENT FOR PROVIDING SERVICES BETWEEN DATA PROCESSING DEVICES

BACKGROUND OF THE INVENTION

1. Field of the Invention

The present invention concerns a method for providing services in which a first data processing device provides a service implementable according to a service configuration for a remote second data processing device. It furthermore concerns an arrangement for implementation of services that is suitable for implementation of the inventive method.

2. Description of the Prior Art

A service in the sense of the present invention is an arbitrary communication event between two data processing devices, for example a data center and an end apparatus that can be connected therewith, wherein data are exchanged between the data processing devices.

For example, in the field of use of franking machines such a service can be a remote value specification for loading of credit from a data center into a franking machine or the readout of usage data such as, for example, register states, etc. from the franking machine into the data center.

Furthermore, such services can be used by a user directly for operation of a data processing device such as, for example, the remote value spec in franking machines. Moreover, they can serve indirectly (for example as a maintenance service) to support the data processing device. Such services can be implemented at the request of third parties, for example a reporting service at a postal authority.

In the conventional implementation or provision of such services, the problem exists that a specific establishment of the service according to a standard ensues that was valid at the point in time of the development of the oldest communication partner, thus the oldest data processing device. The coding of the communication thus ensues in a programming language used at this point in time. Formulations of data fields, data types, messages, etc. are statically effected in the program source and linked to services via a rigid protocol coding. A rigid service configuration thus exists.

Since the end apparatuses with which the services are conducted are typically decentrally distributed at a plurality of clients, a distribution of updates of the services is expensive. The use of service technicians on site for exchange of EPROM modules in the end apparatuses etc. is frequently necessary.

For example, from U.S. Pat. No. 4,528,644 a franking machine is known in which the functions of the franking machine, and therewith also the services that can be implemented with them, are rigidly defined by the firmware of the franking machine. It is in fact possible to provide the available function set one time via configuration messages. A later change of the function set or an update cannot be achieved via such configuration messages.

From U.S. Pat. No. 5,369,401 it is known to assemble the available function set of a franking machine nearly arbitrarily by corresponding commands from a function pool stored in the franking machine. Here as well the problem exists that no simple updating or modification of the individual functions of the function pool is provided.

PCT Application WO 02/13145 discloses providing individual, optional functions of a data processing device (such as a franking machine) via a user-controlled downloading of software modules from a data center or the like. The disadvantage exists that a complete software module that includes all definitions of the appertaining function must always be downloaded, so a significant data volume to be transferred can occur. This method is thus not suited, or is only conditionally suited, for continuous updating of functions. Furthermore, the downloading ensues only at the request of the user of the data processing device, such that it ensues only for functions that are known to the user, or of which the user is aware.

SUMMARY OF THE INVENTION

An object of the present invention is to provide a method and an arrangement of the type described-above that do not exhibit the aforementioned disadvantages or exhibits them at least to a lesser degree, and in particular that enable a simple and fast updating and modification of services.

The present invention is based on the recognition that a simple and fast updating or modification of services is possible when the service configuration of the appertaining service is designed in a modular fashion, such that individual components of the service configuration can be exchanged or updated in order to bring the service to the current state. According to the invention, for this purpose the service configuration is designed in a modular fashion from a number of components, and at least one of the components of the service configuration can be changed to update the service.

This has the advantage that the structure and the functioning of components of the service (such as, for example, data fields, messages and message sequences etc.) can be changed quickly and flexibly. In particular for smaller changes, the entire service configuration does not have to be completely changed; rather, it is sufficient to change the appertaining components. Furthermore, the development of services can be significantly accelerated with regard to variants of the service since the conversion process can be implemented without source processing, program translations and generation, etc.

A further advantage of the present invention is that changes in protocols can be administered centrally in the data processing device (for example a data center) and, upon establishment of a communication link with a second data processing device (for example a terminal apparatus), can be transferred to the second data processing device. This can ensue controlled by the first data processing device and independent of the actual service request of the appertaining second data processing device. In other words, the updating of the first service configuration can be initiated and/or controlled by the first data processing device without the need for a corresponding request for this by the second data processing device. The second data processing devices (all or, if applicable, grouped according to arbitrary criteria) in operation can thus be simply maintained at the most current state.

The costs for on-site deployment of technicians are significantly reduced with the present invention. Moreover, as mentioned all second data processing devices in operation can be reached quickly without a large administrative effort.

Preferably, in an providing step, the data processing device selects the first service in a first step according to a selection criterion that can be predetermined by the data processing device, and determines the current valid service configuration of the service in a second step, and provides at least one component of the determined, currently-valid first service configuration in a third step.

An updating of the service configurations and therewith of the services herewith by the predeterminable selection criterion is possible. The selection criterion can be predetermined by any party.

The providing can ensue at an arbitrary point in time, initiated by an arbitrary predeterminable event. For example, the services available for a specific second data processing device can be provided in their most current version at specific time intervals. This can occur by the appertaining, most current service configurations, or their components required for updating, being loaded into a corresponding service memory of the first data processing device in order to provide the service.

The providing preferably ensues triggered by a communication session with the appertaining second data processing device since the processing expenditure incurred overall in the first data processing device is limited to the actual expenditure necessary for this purpose, the selection of the first service preferably ensues in the aforementioned first step, in reaction to the communication with the second data processing device.

Depending on the configuration of the service, the provision of the service can be limited to providing the corresponding service configuration in the data processing device. This can occur, for example, when the appertaining service is designed such that only the first data processing device requires correspondingly updated information with regard to the service configuration.

In cases in which the second data processing device also requires updated information with regard to the service configuration for implementation of the service, preferably at least one component of the determined first service configuration is provided to the second data processing device in the third step for transmission. In a fourth step of the providing step, the first data processing device then preferably transmits at least one component of the determined first service configuration to the second data processing device.

As mentioned, the selection criterion can be predetermined based on any criterion. Thus the selection criterion can be defined by the service or services requested by the second data processing device. In other words, the current service requested via a communication connection can be provided in the most current state.

Additionally or alternatively, independently of a current request, a number of services available for a specific second data processing device can be provided in the most current state. These can be all services available for the second data processing device. These can likewise be all services available for the second data processing device that have experienced a modification in a predetermined time span. This predetermined time span can be a predetermined time interval, or a variable time interval, for example the time span since the last communication with the appertaining second data processing device.

The selection criterion therefore preferably predetermines the first service to be selected dependent on a service requested by the second data processing device in the framework of the communication with the second data processing device. The selection criterion can additionally or alternatively predetermine the first service to be selected dependent on a data processing device identifier of the second data processing device.

In a preferred variant of the inventive method with transmission of the service configuration component or service configuration components to the second data processing device, it is checked whether the most current service configuration is available in the second data processing device. For this purpose it is preferable that, in the fourth step, the first data processing device compares available first service configuration version information (that is associated with the first service configuration of the first service available in the second data processing device) with current first service configuration version information that is associated with the currently valid first service configuration of the first service. The (at least one) component of the determined first service configuration is then transmitted to the second data processing device when the available first service configuration version information deviates from the current first service configuration version information.

This checking can ensue using information stored in the first data processing device about the current services available in a second data processing device. However, it is likewise also possible for the appertaining data processing device to initially transmit corresponding information to the first data processing device in the framework of the communication, using which corresponding information the first data processing device then conducts the check. The available first service configuration version information is therefore preferably received in the first data processing device in the framework of the communication with the second data processing device.

The selection criterion can be predetermined not by a first data processing device but rather by an external location, for example via a third data processing device. For example, the franking machine sector can be a postal authority that predetermined the selection criterion.

In further preferred variants of the inventive method, the first service includes at least one first service function component and at least one first service component that are defined by the first service configuration. The first service component is at least partially defined by a first definition component of the first service configuration. Furthermore, the first service configuration is fashioned such that at least the first definition component of the first service configuration can be modified separately, i.e. can be changed or (if applicable) even completely exchanged.

The first service function component designates a component of a service which represents the actual function of the service, or one of its functions. This can be a program component that provides one or more technical method calls. For example, it can be the implementation of calculations, the storage of data or their readout of data. The first service function component can establish or define the exchange with technical resources of the appertaining data processing device.

The first service component designates a further component in addition to this first service function component. It can be an arbitrary component of the first service. For example, it can be a component that defines the process of the first service and/or specific parameters which use the first service function component.

Among other things, in these variants it is possible in a simple manner to nearly arbitrarily vary or update services without leaving a framework predetermined by the first service function component. For example, if a first service function component of a first service supplies the readout of a specific number of parameters from the second data processing device upon its invocation or its execution, an arbitrary variation of the result of the first service can ensue due to the variability of the first service component in this framework. For example, the first service component can establish that all or only an arbitrarily definable part of the parameters supplied by the first service function component are transferred to the first data processing device. It can likewise be established in which formatting or other embodiment these parameters are transferred.

Finally, due to the variability of the first service component the type of the transfer of these parameters can likewise be influenced like the type and manner of the communication between both data processing devices themselves.

In preferred variants of the inventive method, the first service component is at least partially defined by at least a first data field. The first data field is then defined by a first data field configuration that is in turn defined at least partially by the first definition component. In other words, the variation of the first definition component can thus influence individual data fields defining the first service, and thus the first service can be modified or, respectively, updated. The first data field is preferably composed of generic data elements (thus from structures that can no longer be further derived from basic data elements) or from quantities of generic or derived data elements that form a macroscopic structure that is reasonable in the application context.

Furthermore, the first data field configuration can have an arbitrarily modular design. The first data field preferably includes a first data field identifier that characterizes a singularity or a group association as a data field configuration component. The first data field additionally or alternatively includes first data field type information (for example an identification as a whole number value, as a floating point value, as a text string etc.) as a data field configuration component. The first data field configuration additionally or alternatively includes first data field version information as a data field configuration component. The first data field configuration additionally or alternatively includes first data field length information, for example with regard to the number of the characters of a text string etc., as a data field configuration component. As a data field configuration component, the first data field configuration additionally or alternatively includes first data field composition information (thus one or more rules for composition of other data elements, for example the rule that the data field "Name" is composed of the text string "first name" and the text string "last name", etc.) as a data field configuration component. The first data field configuration additionally or alternatively includes first data field value range information, for example as a value range of whole number values between 0 and 9, as a data field configuration component. The first data field configuration additionally or alternatively includes first data field processing information which describes the handling of the data fields before and/or after the transmission (such as, for example, a compression, authentication, encryption or any other methods that act on data fields) as a data field configuration component.

At least one data field configuration component is then defined by the first definition component, such that the first data field configuration and therewith the first service can be modified in a nearly arbitrary manner.

In preferred variants of the inventive method the first service component is at least partially defined by at least one first message. The first message is thereby defined by a first message configuration that is in turn defined at least in part by the first definition component. In other words, the variation of the first definition component can influence individual messages defining the first service and thus can modify or, respectively, update the first service. The term "messages" in the sense of the present invention designate data elements comprised of data fields, which data elements form the generic transfer unit for the communication.

The first message configuration preferably includes a first message identifier and/or first message type information and/or first message version information and/or first message length information as a message configuration component. The first message configuration additionally or alternatively includes first message processing information which defines the handling of the message before and/or after the transmission (such as, for example, the compression, authentication, encryption, translation, etc.) as a message configuration component.

At least one message configuration component is defined by the first definition component, such that the first message configuration and therewith the first service can be modified in a nearly arbitrary manner. Furthermore, the message configurations can wholly or partially refer to the configuration entries of data fields and use these, such that a message configuration can, if applicable, also be modified via a modification of such a data field. The first message therefore preferably includes a first data field.

In further preferred embodiments of the inventive method, the first service component is at least partially defined by at least one first protocol, whereby the first protocol establishes a sequence of messages to be exchanged in the framework of the first service. In other words, individual protocols defining the first service can be influenced via the modification of the first definition components and the first service can thus be modified or updated. In the sense of the present invention, protocol configurations preferably establish the sequence of messages in services and regulate the handling of the message transfer.

The first protocol configuration preferably includes a first protocol identifier and/or first protocol version information as a protocol configuration component. The first protocol configuration additionally or alternatively includes first message sequence information that establishes the sequence of the messages to be exchanged as a protocol configuration component.

The first protocol configuration furthermore additionally or alternatively includes first protocol control information as a protocol configuration component. This can be instructions regarding wait times in message sequences for control or adaptation of time overruns. Furthermore, these can be instructions for protocol process controls that establish the handling of repetitions. Furthermore, these can be instructions regarding protocol process controls that establish the handling of conditional protocol paths that in turn establish the message sequence on the basis of internal or external conditions. Furthermore, these can be instructions regarding protocol process controls that regulate the processing of synchronous or asynchronous messages. Furthermore, these can be instructions that define repetition conditions of messages in loops or in the case of flawed transfers of preceding messages. Furthermore, these can be instructions that define result identifiers that in turn establish whether messages are assessed as successful and which proceeding processing steps are to be executed.

In this context, it is possible to define what are known as transaction markers. These transaction markers define specific points associated with one or more transactions in the workflow of a protocol. In a simple case, what are known as initial markers and end markers can be established that define the beginning and the successful end of a transaction. In the event of a termination of a transaction and therewith of a protocol workflow, the transaction can be returned back to the last initial marker. In other words, the previous protocol results of this transaction can be cancelled or discarded.

In addition to the targeted rollback of the transactions, transaction markers can be used for a restart of the protocol after errors. By passing an associated end marker, protocol steps that have already been detected as successfully executed do not have to be repeated or rolled back, such that previous protocol results for these remain achieved and the overall duration of the service implementation remains low. With these transaction markers it is thus possible to design the protocol workflow more robustly with regard to errors and terminations.

Finally, such a protocol normally also includes the first service function component mentioned above that establishes the technical function of the appertaining service and which is thus embedded in the protocol of the first service. The first protocol therefore includes at least the first service function component as a further protocol component.

At least one protocol configuration component is defined by the first definition component, such that the first protocol configuration and therewith the first service can be modified in a nearly arbitrary manner. Furthermore, the protocol configuration can wholly or partially refer back to the configuration entries of data fields and/or messages and use these, such that a protocol configuration also can be modified, if applicable, by a modification of such a data field or a message.

In preferred variants of the inventive method, the first service configuration establishes the sequence of protocols to be executed in the framework of the first service. Service configurations preferably establish the workflow environment of protocols and the coupling or combination of protocols.

The first service configuration preferably includes a first service identifier and/or first service version information as a service configuration component. The first service configuration additionally or alternatively includes first protocol sequence information of the protocols to be executed (which establishes the sequence of protocols to be chained together that form the service) as a service configuration component.

The first service configuration additionally or alternatively includes first service control information as a service configuration component. This can be connection information such as, for example, the type of the connection (modem, ISDN, DSL etc.), the dial-up point or target address, the communication means to be used, and transport protocols (TCP, X25 etc.). Furthermore these can be result identifiers of the protocols and their further processing, for example instructions as to whether or when services or protocols are deemed as successful and which further processing steps should be connected.

Finally, the first service configuration can include first service variant information as a service configuration component. This allows the formation of country variants and language-dependent information such as help texts, error messages, etc.

At least one service configuration component is defined by the first definition component, such that the first service configuration and therewith the first service can also be modified in this manner in a nearly arbitrary manner. Furthermore, the service configuration can wholly or partially refer back to the configuration entries of data fields and/or messages and/or protocols and use these, such that a service configuration also can be modified, If applicable, by a modification of such a data field or a message or a protocol.

In preferred variants of the inventive method, the first service configuration and therewith the first service is changed dependent on a first modification specification. For this purpose, at least the first definition component is preferably modified dependent on a first modification specification. This modification specification can be predetermined by any criterion. For example, it can be predetermined by the first data processing device, however, it can likewise be predetermined externally. For example, the modification specification can ensue via a third data processing device that is operated, for example, by a postal authority in an application in the franking machine sector.

The coding of the configurations of the first service or of its components can ensue in any suitable manner that enables a corresponding modularity and flexible variability of the services. The coding preferably ensues via a semantically-hierarchical coding format, preferably XML or a format of similar flexibility.

The first service therefore is preferably defined by a first service configuration and/or a first data field configuration and/or a first message configuration and/or a first protocol configuration, and at least one of these configurations is coded by a semantically-hierarchical coding format, in particular XML.

The storage of the configuration components of the first service can ensue in a distributed manner, i.e. in a number of files. The storage preferably ensues in a single file or a single data set. Therefore, preferably the first service is defined by a first service configuration and/or a first data field configuration and/or a first message configuration and/or a first protocol configuration, and the configurations defining the first service are combined into a first configuration data set.

The present invention in principle can be used in any field in which services are implemented between a first data processing device and a second data processing device. It is particularly suitable for a use in the franking machine sector. The first data processing device therefore is preferably a data center and/or the second data processing device is preferably a franking machine.

The present invention furthermore preferably concerns a method for implementation of services in which: a communication connection is established between a first data processing device and a remote second data processing device in an initialization step; at least one first service is provided with the inventive method in a providing step; and at least the already-provided first service is implemented between the first data processing device and the second data processing device in an implementation step. The first service is preferably requested in the first data processing device by the second data processing device in the initialization step.

The present invention furthermore concerns an arrangement for implementation of services between a first data processing device and a second data processing device remote from the first, with a first data processing device that is fashioned to provide a first service (implementable according to a first service configuration) for a second data processing device and with a second data processing device remote from the first. The first service configuration is inventively designed modular from a plurality of components, whereby at least one of the components of the first service configuration can be altered to update the first service.

The advantages and variants of the inventive method that are described above can be realized to the same degree with this arrangement.

The present invention also concerns a data processing device that is fashioned as a first data processing device of an inventive arrangement as well as a data processing device that is fashioned as a second data processing device of an inventive arrangement. The advantages and variants of the inventive method that are described above can be realized to the same degree with this arrangement.

DESCRIPTION OF THE PREFERRED EMBODIMENTS

Figure 1:
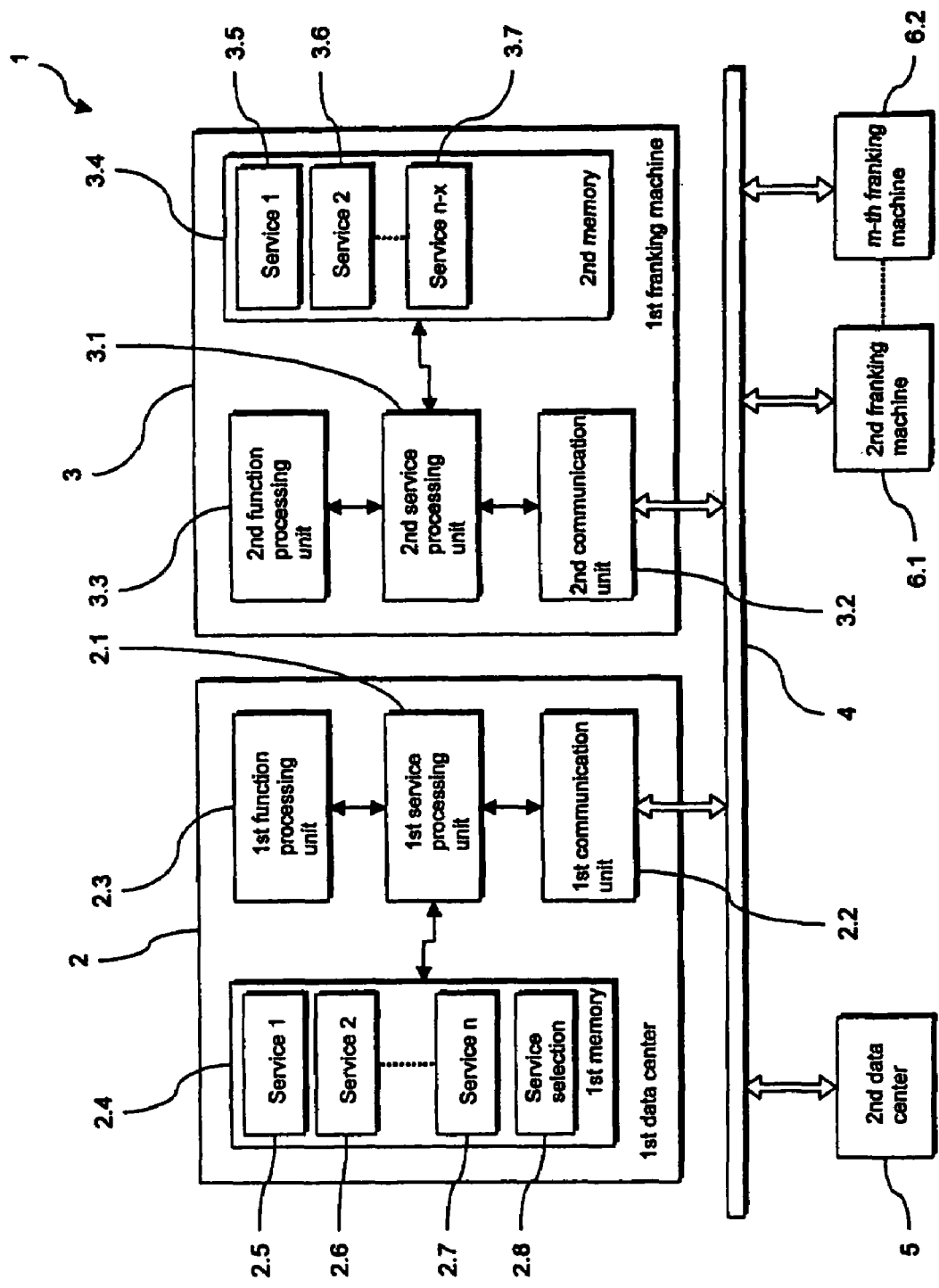
FIG. 1 schematically illustrates a preferred embodiment of the inventive arrangement for implementation of the inventive method for providing and implementation of services.

FIG. 1 shows a schematic representation of a preferred embodiment of the inventive arrangement 1 for implementation of a preferred embodiment of the inventive method for providing and implementation of services between a first data processing device of a first data center 2 and a second data processing device in the form of a franking machine 3.

The first data center 2 is operated by a manufacturer of the franking machine 3. It provides the first franking machine 3 with specific services that can be implemented in the framework of a communication that can occur between the first data center 2 and the first franking machine 3 via a computer network 4.

In the sense of the present invention, such a service is an arbitrary communication event between the data center 2 and the franking machine 3 in which data are exchanged between the data center 2 and the franking machine 3. For example, such a service can be a remote value specification for loading of credit from the data center 2 into the franking machine 3 or the readout of usage data (such as, for example, register states etc.) from the franking machine 3 into the data center 2. Such a service can likewise indirectly serve (for example as a maintenance or configuration service) for support or, respectively, for modification of the functions of the franking machine 3.

In addition to the first data center 2 and the first franking machine 3, the arrangement 1 has a second data center 5 of a postal authority, which second data center 5 can likewise be connected with the first data center 2 via a computer network 4. Further franking machines 6.1, 6.2 that resemble the franking machine 3 in design and function likewise can be connected with the first data center 2 over the computer network 4.

The data center 2 has a first service processing unit 2.1 and a first communication unit 2.2 connected therewith in the form of a modem. Furthermore, the data center 2 has a first function processing unit 2.3 connected with the first service processing unit 2.1. Finally, the data center 2 has a first memory 2.4 connected with the first service processing unit 2.1, in which first memory 2.4 are stored a series of service configurations in memory ranges 2.5 through 2.7.

These service configurations, the design of which is explained in further detail in the following, thereby represent the configuration data for all n services that can be implemented between the data center 2 and the m franking machines 2, 6.1, 6.2. It is understood that, depending on the type and functional scope of the appertaining franking machine, not all n services need be implemented between the data center 2 and the appertaining franking machine. Rather, only a subset of n-x services (which may be the only one service) of the overall configured n services can also be provided or made available for the respective franking machine.

The franking machine 3 has a second service processing unit 3.1 and a second communication unit 3.2 connected therewith in the form of a modem. Furthermore, the franking machine 3 has a second function processing unit 3.3 connected with the second service processing unit 3.1. The franking machine 3 has a second memory 3.4 connected with the second service processing unit 3.1, in which second memory 2.4 the n-x service configurations of the services available for the franking machine 3 are stored in memory ranges 3.5 through 3.7.

In the following, the design or the structure of the service configuration defining the respective service is described with reference to FIGS. 2A through 2C.

Figure 2A:
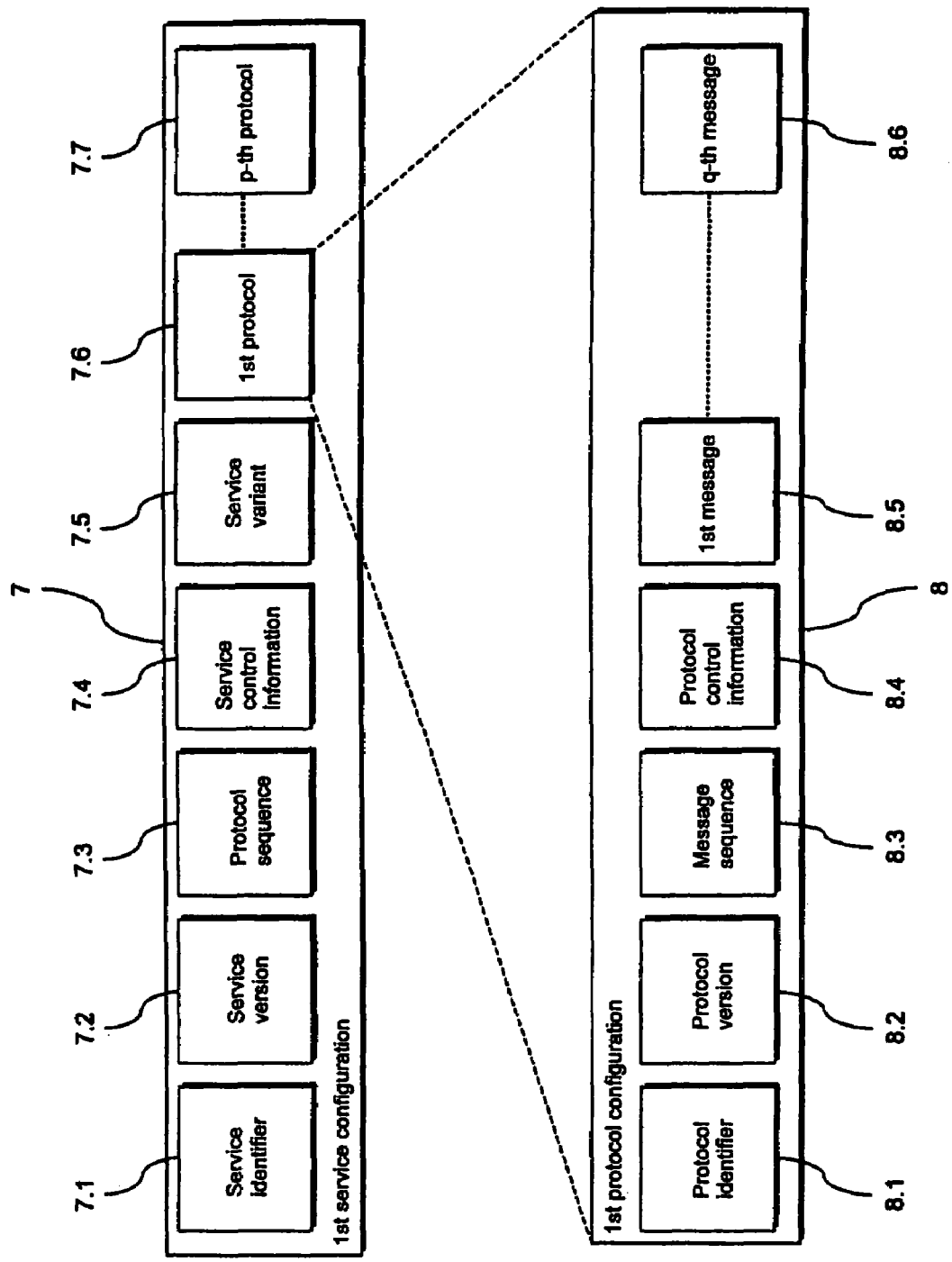
FIG. 2A schematically illustrates a service configuration and a protocol configuration that are used in the arrangement of FIG. 1.

As can be seen in FIG. 2A, the first service configuration 7 of the first service includes a series of service configuration components 7.1 through 7.7 that define the first service and thus represent definition components of the first service. A first service identifier 7.1 which uniquely identifies the first service is thus provided as a first service configuration component. First service version information 7.2 which identifies the current version of the first service is provided as a second service configuration component 7.2.

First protocol sequence information of the protocols, to be executed in the framework of the first service, is provided as a third service configuration component 7.3, which first protocol sequence information establishes the sequence of the protocols to be combined with each other.

First service control information is additionally provided as a fourth service configuration component 7.4. This can be connection information such as, for example, the type of the connection (modem, ISDN, DSL etc.), the dial-up point or target address, or the communication means to be used and transport protocols (TCP, X25 etc.). Furthermore these can be result identifiers of the protocols and their further processing, for example instructions as to whether or when services or individual protocols are deemed as successful and which further processing steps should be connected.

First service variant information furthermore can be provided as a fifth service configuration component 7.5. This allows the formation of country variants and language-dependent information such as help texts, error messages, etc.

Lastly, the first service configuration 7 includes a first protocol configuration of a first protocol as a further service configuration component 7.6 as well as a number of further protocol configurations (up to protocol configuration 7.7 of a p-th protocol of the first service) as further service configuration components. Each protocol establishes a sequence of messages to be exchanged between the data center 2 and the franking machine 3 in the framework of the first service.

A number of protocols are to be executed in the framework of the first service in the present example. In this context, however, it is understood that in other variants of the invention, if applicable, only a single protocol is to be executed, and accordingly only a single protocol configuration need be provided.

As can furthermore be seen from FIG. 2A, the first protocol is defined by a first protocol configuration 8. This protocol configuration 8 includes a series of protocol configuration components 8.1 through 8.6. These protocol configuration components 8.1 through 8.6 define the first protocol and therewith also the first service. Thus, they likewise represent definition components of the first service.

A first protocol identifier that uniquely identifies the first protocol thus is provided as a first protocol configuration component 8.1. First protocol version information 8.2 that identifies the current version of the first protocol is provided as a second protocol configuration component 8.2.

Furthermore, first message sequence information that establishes the sequence of the messages to be exchanged in the framework of the execution of the first protocol is provided as a third protocol configuration component 8.3. As already mentioned, the term "messages" encompasses data elements composed of data fields, which data elements form the generic transmission unit for the communication.

Furthermore, the first protocol configuration 8 includes first protocol control information as a fourth protocol configuration component 8.4. This can be instructions regarding wait times in message sequences, regarding control or regarding adaptation of time over-runs. Furthermore, these can be instructions regarding protocol workflow controls that establish the handling of repetitions. Furthermore, these can be instructions regarding protocol workflow controls that establish the handling of conditional protocol paths that in turn establish the message sequence on the basis of internal or external conditions. Furthermore, these can be instructions regarding protocol workflow controls that regulate the processing of synchronous or asynchronous messages. Furthermore, these can be instructions that define repetition conditions of messages in loops or in the case of faulty transfers of preceding messages. Furthermore, these can be instructions which define result identifiers that in turn establish whether messages are assessed as successful and which proceeding processing steps are to be executed.

The fourth protocol configuration component 8.4 can be composed of a series of transaction markers that define specific points in the workflow of a protocol and that are associated with one or more transactions. In the present cases, these are initial markers and end markers that respectively define the beginning and the successful end of a transaction. In the case of a termination of a transaction and therewith termination of a protocol workflow, the transaction can be rolled back (returned) to the last initial marker. In additional to the targeted rolling-back of the transactions, these transaction markers allow resetting of the protocol after errors. By passing an associated end marker in the event of an error, the protocol steps recognizable as already successfully executed do not have to be repeated or rolled back, such that previous protocol results obtained are retained and the overall duration of the service implementation remains low.

Lastly, the first protocol configuration 8 includes a first message configuration of a first message as a further protocol configuration component 8.5 as well as a number of further message configurations as further protocol configuration components to the point of message configuration 8.6 of a q-th message of the first protocol.

The first message represents a call of a specific service function which, as is explained in further detail in the following, establishes a significant technical function of the appertaining first service and is embedded in this manner in the protocol of the first service. The first message thus defines a first service function component of the first service. The remaining messages of the first protocol configuration 8 represent either further calls of specific service functions or purely service-related messages.

In the present example, a number of messages are to be exchanged in the framework of the first protocol. It is understood, however, that in other variants of the invention, possibly only a few messages need be exchanged, and accordingly only a single message configuration can also be provided.

Figure 2B:
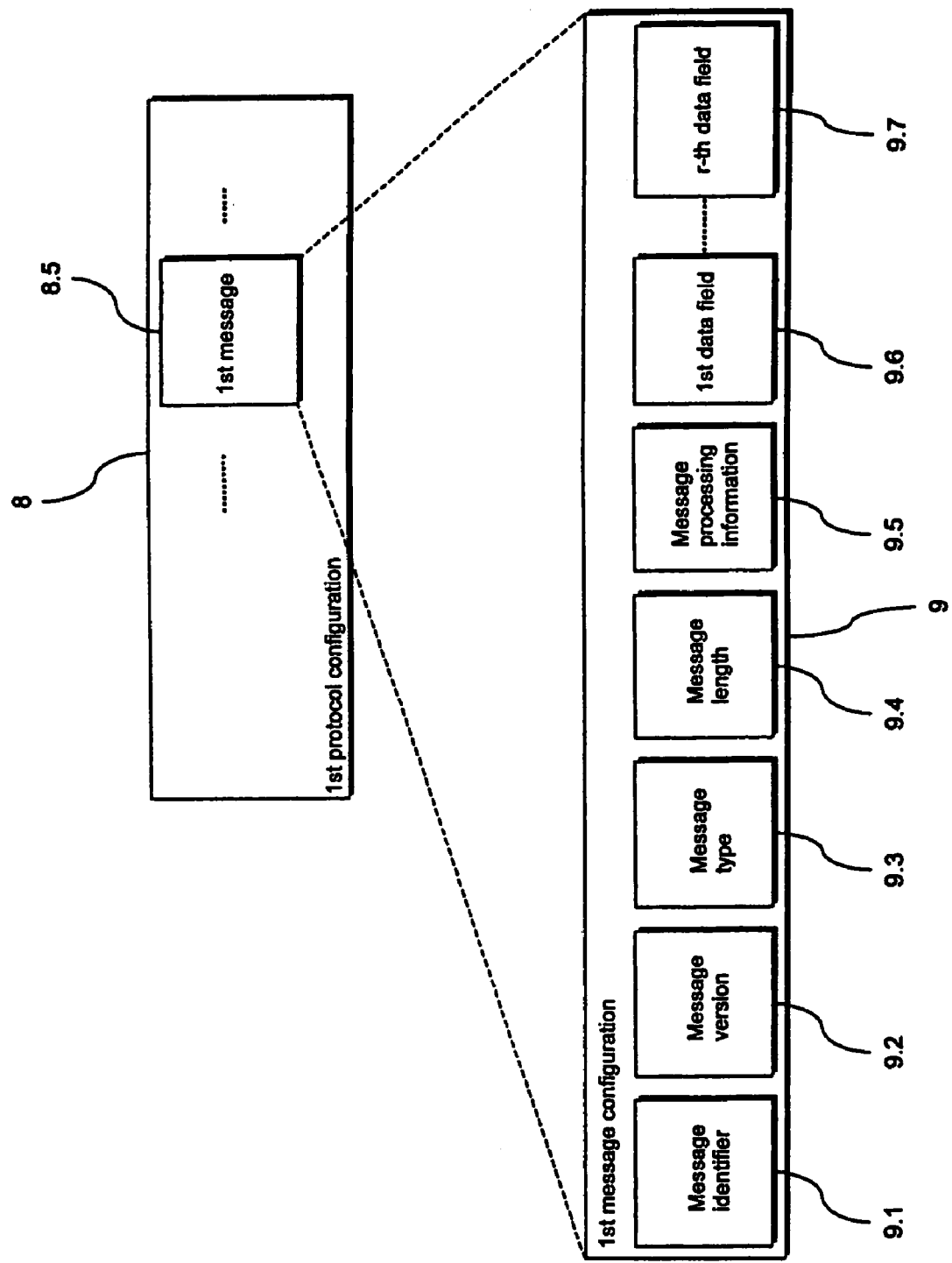
FIG. 2B schematically illustrates a message configuration that is used in the arrangement of FIG. 1.

As can be seen from FIG. 2B, the first message is defined by a first message configuration 9. This message configuration 9 includes a series of message configuration components 9.1 through 9.7. These message configuration components 9.1 through 9.7 define the first message and thus also the first service via the first protocol. Thus they represent definition components of the first service.

A first message identifier that uniquely identifies the first message is provided as a first message configuration component 9.1. First message version information 9.2 that identifies the current version of the first message is provided as a second message configuration component 9.2.

Furthermore, first message type information is provided as a third message configuration component 9.3, and first message length information is provided as a fourth message configuration component 9.4, the components 9.3 and 9.4 defining the message type and the length of the message, respectively.

Furthermore, first message processing information that defines the handling of the message before and/or after the sending (such as, for example, the compression, authentication, encryption, conversion of the message, etc.) is provided as a fifth message configuration component 9.5.

Lastly, as a further message configuration component 9.6 the first message configuration 9 includes a first data field configuration of a first data field of the first massage as well as a number of further data field configurations (up to the data field configuration 9.7 of an r-th data field of the first message) as further message configuration components.

In the present example, the first message is composed of a number of data fields. It is understood that in other variants of the invention, possibly only a single data field and accordingly only a single data field configuration need be provided.

The data fields are composed of generic data elements, i.e., structures that can no longer be further derived from still-more-fundamental n data elements, or from a quantity of generic or derivable data elements that form a macroscopic structure that is reasonable in the application context.

Figure 2C:
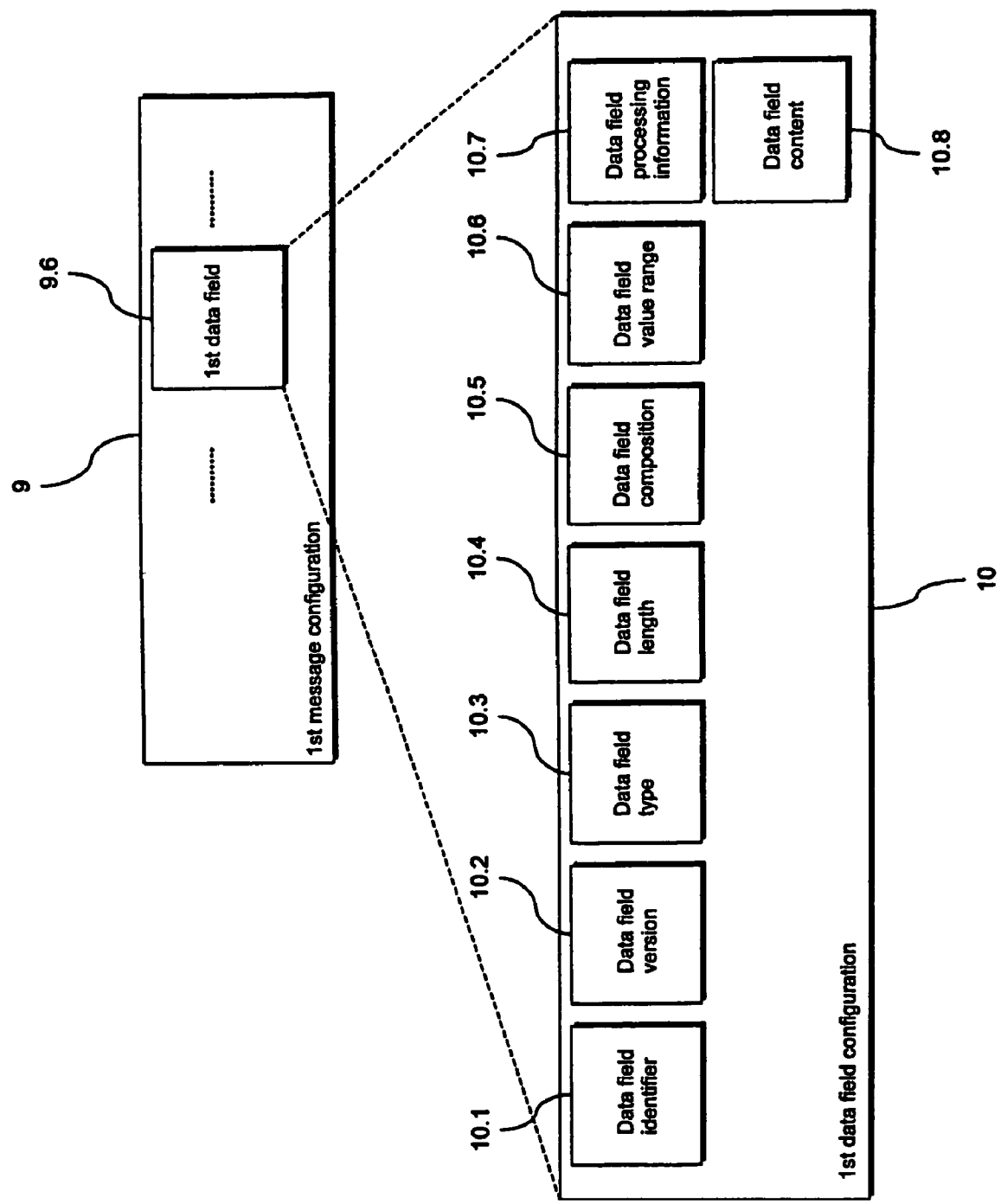
FIG. 2C schematically illustrates a data field configuration that is used in the arrangement FIG. 1.
Figure 3:
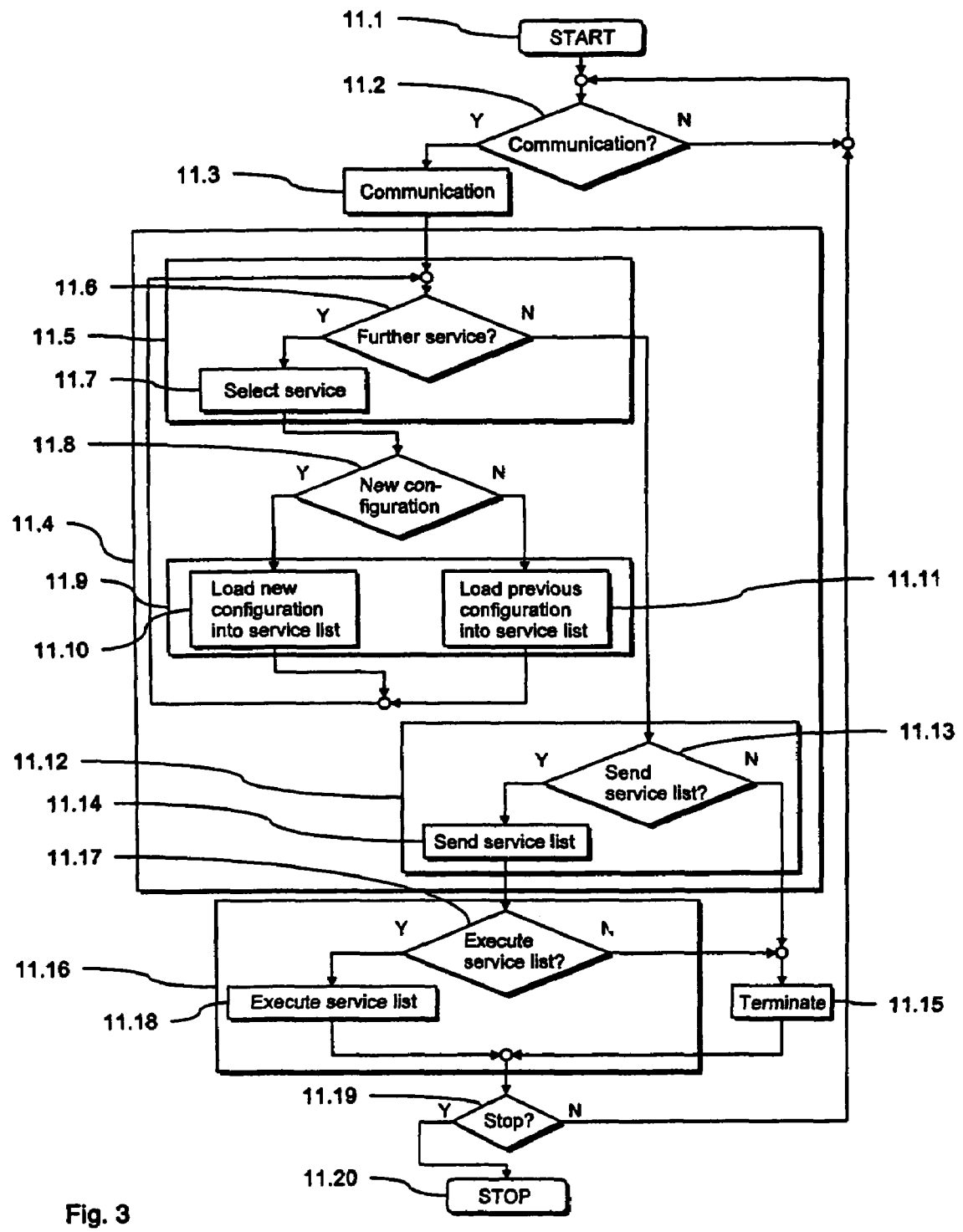
FIG. 3 is a flowchart of a preferred embodiment of the inventive method for providing and implementation of services that is implemented with the arrangement of FIG. 1.

As can be seen from FIG. 2C, the first data field is defined by a first data field configuration 10. This data field configuration 10 includes a series of data field configuration component 10.1 through 10.9. These data field configuration component 10.1 through 10.9 define the first data field and thus also the first service via the first message and the first protocol. Thus they represent definition components of the first service.

A first data field identifier that characterizes the individual or a group association of, the data field is provided as a first data field configuration component 10.1. First data field version information that identifies the current version of the first message is provided as a second data field configuration component 10.2. First data field type information (for example a characterization as a whole number value, as a floating point value, as a text string, etc.) is provided as a third data field configuration component 10.3.

First data field length information (for example with regard to the number of the characters of a text string etc.) is provided as a fourth data field configuration component 10.4. First data field assembly information (thus one or more rules for assembly of other data elements) is provided as a fifth data field configuration component 10.5. First data field range information that establishes a value range of the data field (thus, for example, specifies whole number values between 0 and 9 or the like as a value range) is provided as a sixth data field configuration component 10.6.

Furthermore, first data field processing information that describes the handling of the data fields before and/or after the transmission (such as, for example, a compression, authentication, encryption or any other methods that act on data fields) is provided as a seventh data field configuration component 10.7.

Lastly, a data field content that represents the actual content of the first data field is provided as an eighth data field configuration component 10.8.

It is understood that all or individual configurations can wholly or partially refer back to the configuration entries of subordinate configurations and can use these such that a superordinate configuration, if applicable, also can be modified via a modification of such a subordinate configuration. For example, a service configuration can thus refer back to configuration entries of subordinate configurations in this manner. A protocol configuration can refer back to configuration entries of subordinate configurations such as message configurations and data field configurations. Lastly, message configurations can refer back to configuration entries of subordinate data field configurations.

All configurations that are used to define the first service (thus the service configuration, the protocol configurations, the message configurations and the data field configurations) are coded in the semantically-hierarchical format XML. This allows an arbitrary separate modification and expansion of the configuration entries, i.e. of the respective configuration components that in turn represent respective definition components of the appertaining service. Among other things, it is thus also possible to modify only individual definition components of the appertaining service and herewith thus to also modify the service without having to completely change all configurations defining the service. Services thus can be modified (in particular be expanded) in a simple manner.

A preferred type of the coding of the messages uses XML documents (which are defined by XML schemata) as a semantically-hierarchical representation format. An arbitrary modification or, respectively, expansion of the messages is thus also possible here.

In this context it is understood that, in other variants of the invention, the definition components of all or individual services can be coded in a corresponding manner via a suitable, semantically-hierarchical format other than XML. Likewise, only a part of the definition components of all or individual services can be coded in a corresponding manner via XML or another such semantically-hierarchical format.

All configurations that are used for definition of the first service (thus the service configuration, the protocol configurations, the message configurations and the data field configurations) are thus combined into a single first data set. In other words, all relevant information that describe the first service, its protocols, messages and data fields are combined into a first service data set. This first service data set is stored in an associated memory range 2.5 of the first memory 2.4 of the data center 2.

The service data sets for the n−1 further services that the data center 2 provides are stored in the further memory ranges 2.6 through 2.7 of the first memory 2.5 of the first memory 2.4 of the data center 2.

It is understood that, in other variants of the invention, the configurations that are used for definition of the respective service (thus the service configuration, the protocol configurations, the message configurations and the data field configurations) stored can be in a distributed manner (i.e. individually or combined into arbitrarily-formed groups) in a number of data sets. There exist no limitations with regard to the distribution of the configuration of the service in, for example, one or more files, databanks or EPROM/flash memories.

All configurations that are used for definition of the first service (thus the service configuration, the protocol configurations, the message configurations and the data field configurations), and consequently all definition components of the first service/, can be modified according to the specification of arbitrary predeterminable modification criteria. Parts of the service or the entire service thus can be arbitrarily exchanged or expanded.

The specification of the modification criteria can ensue via the first data center 2. However, it can also ensue from the outside, for example via a communication with the second data center 5.

In the following, a preferred embodiment of the inventive method for providing and implementation of services is described with reference to FIGS. 1 through 3C, the method being implemented with the embodiments of FIG. 1.

The method workflow is initially started in a step 11.1. In a step 11.2, the first service processing unit 2.1 checks whether a current attempt to establish a communication ensues from one of the franking machines 3 through 6.2.

For example, if this is the case for the franking machine 3, a communication connection between the data center 2 and the franking machine 3 is established via the modem 2.2, the communication network 4 and the second modem 3.2.

According to a preferred embodiment of the inventive method for providing of services, in a providing step 11.4 the data center 2 then provides at least a first service for the franking machine 3.

For this purpose, in a first sub-step 11.5 of the providing step 11.4 the first service processing unit 2.1 initially checks in a step 11.6 whether a services for providing or, respectively, implementation for the franking machine 3 is provided. This testing ensues using a selection criterion that is stored in a memory range 2.8 of the first memory 2.4. If the testing in the step 11.6 results in that a first service is to be selected, this is selected in the step 11.7 according to the selection criterion.

The selection criterion can be predetermined in an arbitrary manner. For example, it need merely be established that the services are selected that are requested by the franking machine 3 in the framework of the communication with the franking machine 3. The sequence of the selection of the services can correspond to the requested sequence, but also can deviate therefrom.

Likewise, based on an identification of the franking machine 3, a service can be initially selected that is different than the service requested by the franking machine 3. This enables services to be provided and to be implemented between the data center 2 and the franking machine 3 independently of the request of the franking machine 3.

For example, given each contact with the data center 2, specific updating services or query services can be implemented for the franking machine 3 without these having been requested by the franking machine 3. This makes the administration, maintenance and updating of the operated franking machines 2 through 6.2 substantially easier without significant effort having to be expended for this purpose. It is merely sufficient to establish the selection criterion for the appertaining franking machine, and this can be arbitrarily varied corresponding to the respective requests. A suitable method for such a selection of services to be implemented is described in German Patent Application. 10 2004 001 622.4, the disclosure of which is incorporated herein by reference.

Moreover, in this context the service requested by the franking machine 3 is not selected at all when information exists in the data center 2 that is not provided, or is blocked, for the appertaining service for the franking machine 3. This may result in configurations in which absolutely no service is selected since the requested service is blocked by the selection criterion and otherwise no further service is provided by the selection criterion for selection or providing.

In a second sub-step 11.8 of the providing step 11.4, the current valid service configuration of the first service is then determined, in that it is checked whether a new configuration exists for the appertaining first service.

Thus testing can ensue in that an entry stored in the data center 2 and associated with the franking machine 3 reproduces the last established up-to-date state of the services available in the franking machine 3. This can ensue, for example, using a list of the service configuration version information of the services available in the franking machine 3. This service configuration version information reproduces the current version of the services available in the franking machine 3.

Alternatively for this testing, information that represents the up-to-date state of the services available in the franking machine 3 can be transmitted by the franking machine 3 in the framework of the current communication. This information about the up-to-date state of the services can be transmitted from the franking machine 3 to the data center 2 according to or without a request by the data center 2. Moreover, such a transmission itself represents a service in the sense of the present invention which can be implemented, if applicable, in the manner described herein.

After the testing in the second sub-step 11.8, the corresponding first service is provided in a third sub-step 11.9 of the providing step 11.4. As explained in further detail below, for this purpose at least one component of the current service is loaded into a service list.

For example, if in the second sub-step 11.8 it is established that a change of the first service configuration has ensued in the meantime in the data center 2, such that the first service configuration available in the franking machine 3 is no longer current, the current first service configuration is loaded into the service list from the memory range 2.8 in a step 11.10.

For this purpose, the entire first data set can be loaded into the service list. Due to the modular nature of the service configurations, however, preferably only the components of the first service data set are loaded into the service list in which a change has occurred.

If, in the second sub-step 11.8, it is established that no change of the first service configuration has occurred in the meanwhile in the data center 2, such that the first service configuration available in the franking machine 3 is still current, the previous first service configuration is loaded into the service list in a step 11.10.

For this purpose, the entire previous first service data set can be loaded into the service list. Preferably, however, only an indicator is loaded into the service list that specifies that no change of the first service configuration has occurred.

The method subsequently jumps back to step 11.6, in which it is checked (in the manner described above) whether a further service is provided for providing and implementation.

If this is not the case, a check as to whether the service list should be transmitted to the franking machine 3 ensues in a fourth sub-step 11.12 of the providing step 11.4 in a step 11.13. If this is the case, the service list is transmitted to the franking machine 3 in a step 11.14. If this is not the case (for example due to a faulty communication with the franking machine 3), the communication is terminated in a step 11.15.

The franking machine 3 then updates its service configurations (stored in the second memory) using the transmitted service list, such that the respective most-current service configurations for the appertaining services are then present both in the data center 2 and in the franking machine 3. Due to the modular design of the service configurations, it is sufficient to load only the updated components of the first service data set transmitted with the service list.

In the present example, the sub-steps 11.5, 11.8 and 11.9 of the providing step ensue in reaction to the communication with the franking machine 3. However, it is understood that the composition of the service list already ensues before making contact with the appertaining franking machine. The service list then need be expanded only by the required components of the services requested by the franking machine before it is transmitted to the franking machine.

In an implementation step 11.16, a check is made in a step 11.17 as to whether the services according to the service list should be executed. If this is the case, the updated services are executed in a step 11.1 according to the service list. If this is not the case, for example due to a miscommunication with the franking machine 3, the communication is terminated in the step 11.15.

The implementation of the services thus primarily ensues via the service processing units 2.1 and 3.1. Only the execution of the actual technical functions of the respective service ensues via the respective function processing units 2.3 or 3.3. The appertaining service processing unit 2.1 or 3.1 forwards an appertaining function call to the function processing unit 2.3 or 3.3 via a notification of the service to be executed, the function processing unit 2.3 or 3.3 then executing this function. For example, such a function can be the storage or readout of specific data etc., or the execution of specific programs.

In other words, data are exchanged with the function processing unit 2.3 or 3.3 of the data center 2 or of the franking machine 3 in the course of the services and their protocols. The function processing unit 2.3 or 3.3 forms the communication-independent part of the service processing and thus provides what are known as technical interfaces that generate a result data set upon parameterized request. Technical interfaces process the data that originate from the communication channel and fulfill the technical requirements.

The technical interfaces of the function processing unit 2.3 or 3.3 form the functional framework in which the service configuration can be varied. As explained above, the available interfaces are explicitly executed in the respective service configuration; their concrete form must be noted in the definition of the services.

In later protocol steps, the result data sets of the technical interfaces are transported in messages or held locally in order to implement further process steps. Technical interfaces can be executed, for example, as method calls by program components.

Finally, in a step 11.19 a check is made as to whether the method workflow should be ended. If this is the case, the method workflow ends in a step 11.20. Otherwise the method jumps back to the step 11.2.

In the preceding example, the services were only executed after the current service configurations to be implemented were synchronized in the data center 2 and the franking machine 3, i.e. both were brought up to the most current state. In other variants of the inventive method, however, not only the current service configurations to be implemented, but also all service configurations available for the franking machine are synchronized in the course of every communication or set of communications between the data center and the franking machine that are determined by time or otherwise. It is likewise understood that such a synchronization of the service configurations can be omitted when not required, for example due to the design of the service; rather, the service can be implemented alone with the current service configuration available in the data center.

As explained before, in preferred variants of the invention the service processing unit 2.1 or 3.1 can evaluate the configurations of the services at specific points in time, for example at a system start, or with the beginning of the communication. The evaluation can include, for example, adjustment of communication components or the instancing of processing components. In the data center, after this initialization the service processing unit 2.1 is able to address communications in detail and to offer services. In the franking machine, the communication or the service execution is typically determined or started by the user.

The services to be implemented between the data center 2 and the franking machine 3 can be arbitrary services. Some possibilities of the form of such services are explained as examples in the following.

For example, if one of the service configurations provides text information for the representation of a user interface of the franking machine 3, this can be refreshed in the form of an updating service. Improvements, language adaptations and corrections can thus be initiated and controlled centrally from the data center 2.

A further application is in the transfer of operating parameters that adapt the franking machine 3 to changed or improved circumstances. Thus, for example, a set of communication parameters can be transmitted and implemented in the framework of such a service that changes the setting of a communication layer (for example X25 data link layer) with regard to timeout values or the like.

Furthermore, a franking machine can implement one or more remote calls of programs in the data center 2 in the framework of a service. If, for example, a technical call of an (arbitrary and alternating) technical interface in the data center 2 is respectively defined per message from the franking machine 3 to the data center 2, and the response message respectively supplies the result data set of this technical call, the franking machine 3 thus can use the data center 2 analogously to a local functional component. In this scenario, the definition of the associated service protocol can be kept generic, and thus can be used generally for an entire class of services.

Furthermore, in connection with the present invention it is understood that, in addition to the coding of the message identifiers explained above, all arguments of the technical method calls can be fully defined within the message, thus can be largely complete with regard to the aforementioned characteristics of messages and data fields, such that no or few external assumptions (outside of the message content) are to be considered for the processing.

Services can thus be dynamically adapted to changing requirements of the technical execution with the present invention. For example, if the necessity of a change in the operation of the remote value specification protocol of a franking machine 3 through 6.2 exists in such a way that, instead of a parameter set A, a changed set of parameters should be transferred to the data center 2 at the request of the second data center 5 of the postal carrier, for example in order to support a changed reporting method at the postal authority, the coding of the appertaining service (thus the program components that effects message exchange with the service apparatus) is left unchanged.

Instead of this, the configurations of the remote value specification service are adapted to the new requirements and made available in the data center 3. Depending on the design of the method, these can be service configurations of the data centers or (alternately) also of the franking machine or both sides.

In the dial-up of a franking machine, which is affected (for example by its model identification) by a change of the service configuration, the changed service configuration is loaded into the franking machine as mentioned. This can be implemented in the framework of an updating service that, for example, precedes the service requested by the franking machine. After updating the service configuration in the franking machine, the changed service can be implemented as described. Additional efforts are necessary neither for the user of the franking machine 3 nor for the operator of the data center 2.

A further application case of the inventive method is the updating of service configurations in the franking machine itself image acquisition an updating service. A service is thereby defined whose object is to transfer and to store itself or other service configurations from the data center 2 in the appertaining franking machine, such that subsequent connections with the data center are implemented using the new, updated service configuration.

The present invention was described above using examples with a data center as a first data processing device and franking machines as second data processing devices, but it is understood that the present invention can also be used in connection with the implementation of services between other arbitrary data processing devices.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for providing services in an electronic data processing system, comprising the steps of:

in an electronic memory, storing a plurality of individual service components that respectively define separate functional parts of at least one service to be provided by a first data processing device to a second data processing device, at least one of said service components stored in said memory requiring updating of the functional part thereof;

in response to an input received by said first data processing device, formulating, in said first data processing device, a service configuration for the service to be provided to the second data processing device by accessing said memory from said first data processing device and selecting at least one of said service components stored therein to generate said service with a service configuration defined by the functional part of the at least one service component selected from said memory; and in said first data processing device, when said one of said service components requiring updating is selected as said at least one service component in said service configuration, automatically modifying that service component to update the functional part thereof for inclusion in the service configuration of the service provided from the first data processing device to the second data processing device.

2. A method as claimed in claim 1 comprising formulating said service configuration in said first data processing device by the steps of:

selecting said service according to a selection criterion available in said first data processing device;

determining a currently valid service configuration for said service; and including in said service at least one component of said currently valid service configuration.

3. A method as claimed in claim 2 comprising initiating selection of said service in said first data processing device in response to a communication to said first data processing device from said second data processing device, as said input.

4. A method as claimed in claim 2 comprising providing said service from said first data processing device to said second data processing device with said at least one component of said currently valid service configuration included in said service.

5. A method as claimed in claim 2 comprising employing, as said selection criterion, at least one criterion selected from the group consisting of a service request communicated from said second data processing device to said first data processing device, and a data processing device identifier for said second data processing device.

6. A method as claimed in claim 2 comprising, in said first data processing device, evaluating said currently valid service configuration before providing said at least one component of said currently valid service configuration to said second data processing device.

7. A method as claimed in claim 6 wherein the step of evaluating said currently valid service configuration comprises:
in said first data processing device, comparing information representing a version of said service that is currently present in said second data processing device with information representing said currently valid service configuration; and
transmitting said at least one component of said currently valid service configuration to said second data processing device only if said information representing said version of said service that is currently present in said second data processing device deviates from said information representing said currently valid service configuration.

8. A method as claimed in claim 7 comprising receiving, at said first data processing device, said information representing said version of said service that is currently present in said second data processing device in a communication from said second data processing device to said first data processing device.

9. A method as claimed in claim 1 wherein the step of formulating said service configuration of said service comprises:
combining a first of said service components and a further one of said service components;
defining said further one of said service components according to a definition component in said service configuration of said service; and
modifying said definition component to re-define said further one of said service components, as said at least one of said service components that is modified to update said service.

10. A method as claimed in claim 9 comprising:
at least partially defining said further service component by at least one data field of said further service component; and
in said first data processing device, defining a data field configuration in said definition component that defines said data field of said further service component.

11. A method as claimed in claim 10 comprising, through said definition component, including at least one item selected from the group of items consisting of a data field identifier, data field version information, data field type information, data field length information, data field composition information, data field value range information, and data field processing information.

12. A method as claimed in claim 9 comprising:
in said first data processing device, defining a message configuration of a message with said definition component; and
at least partially defining said further service component dependent on said message configuration of said message.

13. A method as claimed in claim 12 comprising including in said message configuration at least one item selected from the group of items consisting of a message identifier, message type information, message version information, message length information, and message processing information.

14. A method as claimed in claim 12 wherein said message comprises a data field, and comprising including said message configuration in said data field of said message.

15. A method as claimed in claim 9 comprising:
through said definition component, defining a protocol configuration of a protocol that establishes a sequence of messages to be exchanged within said service; and
at least partially defining said further service component with said protocol configuration of said protocol.

16. A method as claimed in claim 15 comprising including at least one item in said protocol configuration selected from the group of items consisting of a protocol identifier, protocol version information, message sequence information of said messages to be exchanged, and protocol control information.

17. A method as claimed in claim 15 comprising including said service function component as a protocol component in said protocol.

18. A method as claimed in claim 9 wherein said protocol is a first protocol, and comprising establishing, through said service configuration, a sequence of protocols comprising said first protocol and at least one further protocol, to be executed in said service.

19. A method as claimed in claim 18 comprising establishing said sequence of protocols through said service configuration by including at least one item in said service configuration selected from the group consisting of a service identifier, service version information, protocol sequence information of said plurality of protocols to be executed, service control information, and service variant information.

20. A method as claimed in claim 9 comprising modifying said definition component by entering a modification specification into said first data processing device.

21. A method as claimed in claim 20 comprising supplying said modification specification to said first data processing device from a third data processing device.

22. A method as claimed in claim 1 comprising:
defining said service through said service configuration using a configuration selected from the group consisting of a data field configuration, a message configuration and a protocol configuration; and
coding each configuration using a semantically-hierarchical coding format.

23. A method as claimed in claim 1 comprising:
defining said service through said service configuration using a configuration selected from the group consisting of a data field configuration, a message configuration and a protocol configuration; and
combining said configurations to form a configuration data set.

24. A method as claimed in claim 1 comprising locating said first data processing device at a data center and locating said second data processing device in a franking machine remote from and in communication with said data center.

25. A method for implementing a service to support data processing, comprising the steps of:

In an electronic memory, storing a plurality of individual service components that respectively define separate functional parts of at least one service to be provided by a first data processing device to a second data processing device that is remote from said first data processing device, at least one of said service components stored in said memory requiring updating of the functional part thereof;

in an initialization step in said first data processing device, establishing a communication between the first data processing device and the second data processing device remote therefrom;

in a providing step in the first data processing device, formulating a service configuration for the service to be provided to the second data processing device by accessing said memory from said first data processing device and selecting at least one of said service components stored therein to generate said service with a service configuration defined by the functional part of the at least one service component selected from said memory, and when said one of said service components requiring updating is selected as said at least one service component in said service configuration, automatically modifying that service component to update the functional part thereof for inclusion in the service configuration of the service provided from the first data processing device to the second data processing device; and in an implementation step involving communication between said first data processing and said second data processing device, transmitting said service with said service configuration from said first data processing device to said second data processing device.

26. A method as claimed in claim 25 comprising, in said initialization step, receiving a request for said service at said first data processing device in a communication from said second data processing device to said first data processing device.

27. An arrangement for providing services in an electronic data processing system, comprising:

a first data processing device;

a second data processing device;

an electronic memory in which a plurality of individual service components are stored that respectively define separate functional parts of at least one service to be provided by the first data processing device to the second data processing device, at least one of said service components stored in said memory requiring updating of the functional part thereof;

said first data processing device in response to an input thereto said data processing device being configured, formulate a service configuration for the service to be provided to the second data processing device by accessing said memory and selecting at least one of said service components stored therein to generate said service with a service configuration defined by the functional part of the at least one service component selected from said memory; and said first data processing device being configured, when said one of said service components requiring updating is selected as said at least one service component in said service configuration, to automatically modify that service component to update the functional part thereof for inclusion in the service configuration of the service provided from the first data processing device to the second data processing device.

28. An arrangement as claimed in claim 27 wherein said first data processing device formulates said service configuration by selecting said service according to a selection criterion available in said first data processing device, determining a currently valid service configuration for said service, and including in said service at least one component of said currently valid service configuration.

29. An arrangement as claimed in claim 28 wherein said first data processing device initiates selection of said service in said first data processing device in response to a communication to said first data processing device from said second data processing device, as said input.

30. An arrangement as claimed in claim 28 wherein said first data processing device provides said service to said second data processing device with said at least one component of said currently valid service configuration included in said service.

31. An arrangement as claimed in claim 28 wherein said first data processing device employs, as said selection criterion, at least one criterion selected from the group consisting of a service request communicated from said second data processing device to said first data processing device, and a data processing device identifier for said second data processing device.

32. An arrangement as claimed in claim 28 wherein said first data processing device evaluates said currently valid service configuration before providing said at least one component of said currently valid service configuration to said second data processing device.

33. An arrangement as claimed in claim 32 wherein said first data processing device evaluates said currently valid service configuration by comparing information representing a version of said service that is currently present in said second data processing device with information representing said currently valid service configuration, and wherein said first data processing device transmits said at least one component of said currently valid service configuration to said second data processing device only if said information representing said version of said service that is currently present in said second data processing device deviates from said information representing said currently valid service configuration.

34. An arrangement as claimed in claim 33 wherein said first data processing device receives said information representing said version of said service that is currently present in said second data processing device in a communication from said second data processing device to said first data processing device.

35. An arrangement as claimed in claim 27 wherein said first data processing device formulates said service configuration of said service by combining a first of said service components and a further one of said service components, defining said further one of said service components according to a definition component of said service configuration of said service, and modifying said definition component to re-define said further one of said service components, as said at least one of said service components that is modified to update said service.

36. An arrangement as claimed in claim 35 wherein said first data processing device at least partially defines said further service component by at least one data field of said further service component, and defines a data field configuration in said definition component that defines said data field of said further service component.

37. An arrangement as claimed in claim 36 wherein said first data processing device, through said definition component, includes at least one item selected from the group of items consisting of a data field identifier, data field version information, data field type information, data field length information, data field composition information, data field value range information, and data field processing information.

38. An arrangement as claimed in claim 35 wherein said first data processing device, defines a message configuration of a message with said definition component, and at least partially defines said further service component dependent on said message configuration of said message.

39. An arrangement as claimed in claim 38 wherein said first data processing device includes in said message configuration at least one item selected from the group of items consisting of a message identifier, message type information, message version information, message length information, and message processing information.

40. An arrangement as claimed in claim 38 wherein said message comprises a data field, and wherein said first data processing device includes said message configuration in said data field of said message.

41. An arrangement as claimed in claim 35 wherein said first data processing device, through said definition component, defines a protocol configuration of a protocol that establishes a sequence of messages to be exchanged within said service, and at least partially defines said further service component with said protocol configuration of said protocol.

42. An arrangement as claimed in claim 41 wherein said first data processing device includes at least one item in said protocol configuration selected from the group of items consisting of a protocol identifier, protocol version information, message sequence information of said messages to be exchanged, and protocol control information.

43. An arrangement as claimed in claim 41 wherein said first data processing device includes said service function component as a protocol component in said protocol.

44. An arrangement as claimed in claim 41 wherein said first data processing device establishes said sequence of protocols through said service configuration by including at least one item in said service configuration selected from the group consisting of a service identifier, service version information, protocol sequence information of said plurality of protocols to be executed, service control information, and service variant information.

45. An arrangement as claimed in claim 35 wherein said protocol is a first protocol, and wherein said first data processing device establishes, through said service configuration, a sequence of protocols comprising said first protocol and at least one further protocol, to be executed in said service.

46. An arrangement as claimed in claim 35 wherein said first data processing device comprises an input unit allowing entry of a modification specification into said first data processing device that modifies said definition component.

47. An arrangement as claimed in claim 46 comprising a third data processing device that supplies said modification specification to said first data processing device.

48. An arrangement as claimed in claim 27 wherein said first data processing device defines said service through said service configuration using a configuration selected from the group consisting of a data field configuration, a message configuration and a protocol configuration, and codes each configuration using a semantically-hierarchical coding format.

49. An arrangement as claimed in claim 27 wherein said first data processing device defines said service through said service configuration using a configuration selected from the group consisting of a data field configuration, a message configuration and a protocol configuration, and combines said configurations to form a configuration data set.

50. An arrangement as claimed in claim 27 comprising a data center at which said first data processing device is located and a franking machine, in which said second data processing device is incorporated, remote from and in communication with said data center.

51. An arrangement for implementing a service to support data processing, comprising:
  a first data processing device;
  a second data processing device that is remote from said first data processing device;
  an electronic memory in which a plurality of individual service components are stored that respectively define separate functional parts of at least one service to be provided by the first data processing device to the second data processing device, at least one of said service components stored in said memory requiring updating of the functional part thereof;
  said first data processing device being configured to establish, in an initialization step a communication between the first data processing device and the second data processing device remote therefrom;
  said first data processing device being configured to formulate, in a providing step, a service configuration for the service to be provided to the second data processing device by accessing said memory from said first data processing device and selecting at least one of said service components stored therein to generate said service with a service configuration defined by the functional part of the at least one service component selected from said memory, and when said one of said service components requiring updating is selected as said at least one service component in said service configuration, automatically modifying that service component to update the functional part thereof for inclusion in the service configuration of the service provided from the first data processing device to the second data processing device; and
  said first data processing device being configured to transmit, in an implementation step involving communication between said first data processing and said second data processing device, said service with said service configuration from said first data processing device to said second data processing device.

52. An arrangement as claimed in claim 51 wherein said first data processing device, in said initialization step, receives a request for said service at said first data processing device in a communication from said second data processing device to said first data processing device.

* * * * *